3,489,561 LITHOGRAPHIC PLATE CLEANING AND DESENSITIZING SOLUTION

John E. Pickard, Selma, Ind., assignor to Ball Brothers Company Incorporated, Muncie, Ind., a corporation of Indiana No Drawing. Filed Aug. 17, 1965, Ser. No. 480,505
Int. Cl. G03f 7/10
U.S. Cl. 96—33 2 Claims

ABSTRACT OF THE DISCLOSURE

A method of cleaning and desensitizing lithographic plates having metallic hydrophilic portions by exposing such portions to a solution of oxalic acid, preferably a 1% to 16% by weight solution.

This invention relates to a novel cleaning and/or desensitizing solution for lithographic plates and to a novel method of cleaning and/or desensitizing lithographic plates.

As is well known in the art, lithographic printing is accomplished on a flat surface (usually metallic today), which surface has portions (printing areas) which are greasy to attract ink and other portions (non-printing areas) which have no grease thereon and are water receptive to repel ink. One of the more common ways to produce a lithographic plate is to treat the plate with a photosensitive resin and then later expose the plate to light through a negative. The unexposed resin is then removed from the plate and the plate desensitized, followed by gumming, if desired.

Heretofore, metallic lithographic plates have been reduced from expected press life because of a scumming problem that is caused by the reaction of the non-printing portions of the plate with ink and fountain solutions. Various attempts have been made in the past to overcome this scumming problem, such as, for example, by applying various solutions to the plate, or coating the plate prior to the application of the photosensitive resin, but none of these attempts have resulted in elimination of the problem. In addition, a problem of gum blinding (i.e., reaction of the gum with the image areas which restrict ink absorption in subsequent press runs) has also existed heretofore when a plate was stored for a period of time.

Various desensitizers have also been utilized, either to desensitize the plate prior to application of the photosensitive resin coating [as is commonly done wtih wipe-on plates and in certain cases with plates that have been sensitized at time of manufacture (presensitized plates)] or to desensitize the plate after the plate has been exposed and developed (as is commonly done with presensitized plates). Previously known desensitizers have, however, like cleaning solutions, proven not to be completely satisfactory, at least partially due to their inability to avoid the scumming problem.

It is therefore an object of this invention to provide an improved cleaning solution for lithographic plates.

It is another object of this invention to provide an improved desensitizing solution for lithographic plates.

It is another object of this invention to provide a cleaning and desensitizing solution which, when used in treating lithographic plates, will cause said plates to have longer press life than was previously attainable.

It is another object of this invention to provide a cleaning and desensitizing solution which, when used to treat lithographic plates, will cause said plates to have excellent resistance to scumming.

It is yet another object of this invention to provide an improved lithographic plate cleaner and desensitizer which will prevent gum blinding in treated plates which are to be stored.

It is still another object of this invention to provide an improved cleaning and desensitizing solution for lithographic plates which is convenient and economical to use, yet enables superior lithographic plates to be produced.

It is yet another object of this invention to provide an improved method for cleaning a lithographic plate.

It is still another object of this invention to provide an improved method for desensitizing a lithographic plate.

Other objects of this invention will also become apparent to one skilled in the art upon reading the following description.

The cleaning and desensitizing solution of the present invention comprises an aqueous oxalic acid solution. The solution contains between about 1% and 16% by weight of oxalic acid and preferably between about 4% and 10% when used as a cleaning solution and about 6% and 10% when used as a desensitizing solution.

As a cleaning or desensitizing solution, this invention is useful for wipe-on plates and, more advantageously, for plates sensitized at time of manufacture (sometimes referred to as "presensitized plates"). With wipe-on plates, the desensitizing solution may be applied over the surface of the plate prior to the application of the photosensitive resin coating. Thus, the desensitizing solution may be applied by the manufacturer of the plate or by the printing shop using the plate. In the case of a presensitized plate, the desensitizing solution is usually applied to the plate after exposure and developing. However, in the manufacture of presensitized plates, it also may be desirable, in certain cases, to apply the desensitizing solution to the base prior to the application of the photosensitive resin coating.

The invention, when used as a cleaner or desensitizer, is particularly well suited for use with zinc or zinc-coated lithographic plates but may be used successfully with aluminum, steel and other plates. In addition, this invention may be successfully used with lithographic plates which have been conventionally grained in the production of the plate.

The treatment of the plate with the solution of this invention requires only a relatively short period of about 10 to 80 seconds, and preferably, about 15 to 50 seconds, although there does not appear to be any deleterious effect on the plate if the cleaning solution remains in contact with the plate surface for an extended period of several minutes or more. If the treatment is for less than 10 seconds, it has been found, however, that the degree of desensitizing is insufficient and that the plate will not be completely cleaned unless it was exceptionally clean before treatment.

To provide a proper surface for the application of the desensitizing solution, the plate is to be clean and free from contaminants, which may be accomplished by washing, either with water or a conventional cleaning solution of the acidic, basic or solvent types.

If desired, other materials may be incorporated in the cleaning solution of the invention for particular cleaning problems. For example, a gum such as gum arabic may be added to the cleaner to facilitate the removal of dried ink from a plate.

After the plate is treated with the cleaning or desensitizing solution of this invention, the plate is dried and is then ready for use. After being desensitized, the plate may also be gummed with a commercially available gum, such as gum arabic.

If the plate is to be stored after use, the cleaning solution of this invention may be applied to the plate prior to the application of a preservative (such as gum arabic, for example). Plates treated with desensitizers of this invention, if newly prepared, or the cleaner of this invention, if previously in use, may be stored for extended periods of time, e.g., several months or more without deleteriously affecting the plate.

The following examples illustrate specific embodiments of the invention and are not intended to restrict or limit the scope of the invention. In the examples, parts and percentages are by weight.

EXAMPLE I

A lithographic plate having a grained zinc surface with a photosensitive polymer (commercially sold under the name of "Kodak Photo Lacquer" by Eastman Kodak Company), thereon, was exposed to ultraviolet light through a flat of negatives and developed with trichloroethylene. After being developed, the plate was desensitized with an 8.5% aqueous solution of oxalic acid and then grained with gum arabic.

The plate was used to print on salmon-colored, uncoated stock using green ink. The plate was run for 234,000 impressions without difficulty. After the run, the plate was examined and found to be in good condition.

Other lithographic plates made according to the above procedure were used under the following conditions and showed the noted results: A press run of 180,000 impressions was obtained with linty newsprint. Press runs with four plates of the invention on a perfecting press using newsprint each exceeded 350,000 impressions. Press runs with sixteen plates of the invention on coated and uncoated stock exceeded 100,000 impressions for each plate and were as high as 500,000 impressions for one of the plates.

In contrast to the above long press runs, it was found that with plates prepared according to the above procedure but desensitized with commercially available desensitizing solutions, the press runs were much shorter in length, i.e., less than about 50% of the above press runs.

EXAMPLE II

The procedure of this example was the same as that of Example I, except that the desensitizing solution contained 10% oxalic acid.

A presensitized plate made according to the procedure of this example had a long press run similar to the superior results shown by the plates of Example I and substantially longer than would normally be expected from plates desensitized with commercially available desensitizing solutions.

EXAMPLE III

An aqueous solution containing about 10% oxalic acid was applied to an aluminum plate which previously had been mechanically grained with a brush grainer using an abrasive slurry. After the plate dried, the plate was coated with the photosensitive polymer employed in Example I. The plate was then exposed, developed and desensitized according to the procedure of Example I.

The plate made according to the above procedure showed the same superior length of press run as the plates of the preceding examples.

EXAMPLE IV

The procedure of this example was the same as that of Example III, except that a diazo photosensitive resin was employed.

The plate had a press run of improved duration as the plates of the earlier examples.

EXAMPLE V

A lithographic plate having a grained zinc surface with a photosensitive polymer (commercially sold under the name of "Kodak Photo Lacquer" by Eastman Kodak Company), thereon was exposed to ultraviolet light through a flat of negatives and developed with trichloroethylene. After being developed, the plate was gummed with gum arabic and then run on a press to print on salmon-colored, uncoated stock using green ink. During the run, the plate began to scum. The press was stopped and an 8% aqueous solution of oxalic acid was applied to the plate to clean the surface. The run was continued without further scumming until 234,000 impressions were made. After the run, the plate was examined and found to be in good condition.

In contrast to the above long press run, it was found that with plates prepared according to the above procedure but in which the plate was not descummed with the plate cleaner of the invention, the press runs were much shorter in length, i.e., less than about 40% of the above press run.

EXAMPLE VI

The procedure of this example was the same as that of Example V, except that the cleaning solution contained 6% oxalic acid.

A presensitized plate made and descummed according to the procedure of this example had a long press run similar to the superior results shown by the plates of Example V and substantially longer than would normally be expected from the plates descummed with commercially available cleaning solutions.

EXAMPLE VII

The procedure of this example was the same as that of Example V, except that the plate was an aluminum plate which had been coated with a diazo photosensitive resin.

The plate produced and descummed by the procedures of this example showed the same superior length of press run shown by the plates of Examples V and VI.

EXAMPLE VIII

An aqueous solution containing about 8% oxalic acid was applied to the plate of Example V and then the plate was coated with gum arabic and stored. After 8 weeks, the plate was cleaned again with an 8% aqueous oxalic acid solution and then run for an additional 85,000 impressions.

The plate made and processed according to the above procedure did not exhibit any gum blinding and showed a superior length of press run as compared with similar plates which had not been cleaned with the cleaner of the invention prior to storage.

EXAMPLE IX

The procedure of this example was the same as that of Example VIII, except that the plate was a wipe-on plate which had been coated with a diazo photosensitive resin.

The plate had improved press performance as the plate of Example VIII.

EXAMPLE X

The procedure of this example was the same as that of Example V, except that equal quantities of a 14° Baumé gum arabic solution and the 8% oxalic acid solution were mixed to form the cleaning solution. Ink, which had been permitted to dry on the surface of the plate, was easily removed using the above cleaning solution.

The above description and examples show that the present invention provides a new and improved cleaning and desensitizing solution for lithographic plates and, particularly, for zinc lithographic plates. Also, plates treated with the solution of this invention have excellent resistance to scumming and perform successfully even under unfavorable press conditions. In addition, gum blinding is prevented during storage of the plates treated with the solution of this invention.

From the above description, it will be apparent that various modifications and changes in the procedures and formulations may be made within the scope of the invention. Therefore, the invention is not intended to be limited to the specific examples and detailed procedures except as may be required by the following claims.

What is claimed is:

1. A method of desensitizing a metallic lithographic plate comprising exposing a lithographic plate coated with a photosensitive layer to actinic light, developing said lithographic plate and desensitizing uncovered metal portions of said plate with an aqueous oxalic acid solution comprising between about 1% and 16% by weight of oxalic acid.

2. A method of desensitizing a metallic lithographic plate comprising exposing a lithographic plate coated with a photosensitive layer to ultraviolet light, developing said lithographic plate and desensitizing uncovered metal portions of said plate with an aqueous oxalic acid solution consisting essentially of between 6% and 10% by weight of oxalic acid.

References Cited

UNITED STATES PATENTS

| | | | |
|---|---|---|---|
| 805,031 | 11/1905 | Schmiel | 101—465 |
| 2,532,866 | 12/1950 | Toland et al. | 96—33 X |

OTHER REFERENCES

LeFebvre: National Lithographer, 1950, vol. 57, issue 4, pp. 32–33, "The New Colloid Litho Plate."

Hartsuch: Chemistry of Lithography, 1961, Lithographic Technical Foundation, Inc., pp. 106–107, 110–111, 116, 299–300.

Hartsuch: "Chemistry of Lithography," 1961, LTF, Inc., pp.105, 123–130.

GEORGE F. LESMES, Primary Examiner

R. E. MARTIN, Assistant Examiner

U.S. Cl. X.R.

96—48